(12) United States Patent
Avraham et al.

(10) Patent No.: US 10,705,763 B2
(45) Date of Patent: Jul. 7, 2020

(54) SCALE AND PERFORMANCE FOR PERSISTENT CONTAINERS USING SCSI SECOND LEVEL ADDRESSING TO MAP STORAGE VOLUME TO HOST OF CONTAINER ENVIRONMENT, WHEREIN SAID STORAGE VOLUME IS SCANNED AT SAID SCSI SECOND LEVEL ADDRESSING WITHOUT RESCANNING AT OS LEVEL VIRTUALIZATION

(71) Applicant: International Business Machines Corporation, Armonk, NY (US)

(72) Inventors: Amalia Avraham, Petach Tikva (IL); Shay Berman, Modlin (IL); Ran Harel, Kfar-Saba (IL); Rivka M. Matosevich, Zichron-Ya'acov (IL)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 15/430,347

(22) Filed: Feb. 10, 2017

(65) Prior Publication Data
US 2018/0232141 A1 Aug. 16, 2018

(51) Int. Cl.
*G06F 3/06* (2006.01)
*G06F 9/455* (2018.01)
*G06F 12/10* (2016.01)

(52) U.S. Cl.
CPC .......... *G06F 3/0665* (2013.01); *G06F 3/061* (2013.01); *G06F 3/0683* (2013.01); *G06F 9/455* (2013.01); *G06F 12/10* (2013.01); *G06F 2212/651* (2013.01)

(58) Field of Classification Search
None
See application file for complete search history.

(56) References Cited

U.S. PATENT DOCUMENTS

| | | | |
|---|---|---|---|
| 7,600,093 B2 | 10/2009 | Ben-Yehuda et al. | |
| 8,489,811 B1 | 7/2013 | Corbett et al. | |
| 8,650,359 B2 | 2/2014 | Vaghani et al. | |
| 8,892,818 B1 | 11/2014 | Zheng et al. | |
| 9,122,579 B2 | 9/2015 | Flynn et al. | |
| 9,667,725 B1* | 5/2017 | Khanduja | G06F 9/45558 |
| 9,697,130 B2* | 7/2017 | Karippara | G06F 9/50 |
| 9,785,495 B1* | 10/2017 | Lazier | G06F 11/079 |
| 2006/0206687 A1* | 9/2006 | Vega | G06F 12/10 711/206 |
| 2007/0050763 A1* | 3/2007 | Kagan | G06F 13/12 718/1 |

(Continued)

OTHER PUBLICATIONS

NIST Cloud Computing Program, NIST, Information Technology Laboratory, Nov. 15, 2010, Last Updated Nov. 13, 2013, pp. 1-2, Retrieved from http://www.nist.gov/itl/cloud/.

(Continued)

*Primary Examiner* — William B Partridge
*Assistant Examiner* — Chie Yew
(74) *Attorney, Agent, or Firm* — Zilka-Kotab, P.C.

(57) ABSTRACT

A computer-implemented method according to one embodiment includes identifying a host within a container environment, and mapping a volume of a container to the host within the container environment, utilizing small computer system interface (SCSI) second level addressing.

12 Claims, 7 Drawing Sheets

(56) References Cited

U.S. PATENT DOCUMENTS

| | | | | |
|---|---|---|---|---|
| 2009/0077343 A1* | 3/2009 | Sakaki | ............... | G06F 3/0607 |
| | | | | 711/206 |
| 2009/0204759 A1* | 8/2009 | Seaman | ............... | G06F 3/0605 |
| | | | | 711/114 |
| 2010/0235832 A1* | 9/2010 | Rajagopal | ............... | G06F 3/0605 |
| | | | | 718/1 |
| 2010/0275201 A1* | 10/2010 | Lunawat | ............... | G06F 9/45537 |
| | | | | 718/1 |
| 2011/0179214 A1* | 7/2011 | Goggin | ............... | G06F 3/061 |
| | | | | 711/6 |
| 2012/0047348 A1* | 2/2012 | Devine | ............... | G06F 12/1009 |
| | | | | 711/206 |
| 2013/0254369 A1* | 9/2013 | Rogel | ............... | G06F 9/45533 |
| | | | | 709/223 |
| 2014/0237464 A1* | 8/2014 | Waterman | ............... | G06F 8/65 |
| | | | | 717/172 |
| 2014/0282538 A1* | 9/2014 | Conover | ............... | G06F 9/45558 |
| | | | | 718/1 |
| 2015/0378641 A1* | 12/2015 | Franke | ............... | G06F 3/0664 |
| | | | | 710/74 |
| 2017/0098071 A1* | 4/2017 | Stopel | ............... | G06F 21/554 |

OTHER PUBLICATIONS

Mell et al., "The NIST Definition of Cloud Computing," Version 15, Oct. 7, 2009, pp. 1-2.
Mell et al. "The NIST Definition of Cloud Computing," NIST, Special Publication 800-145, Sep. 2011, pp. 1-7.
Penokie George, "Addressing Model for SAM-2," X3T10 Committee (SCSI), Feb. 11, 1997, pp. 1-5.

* cited by examiner

SCALE AND PERFORMANCE FOR PERSISTENT CONTAINERS USING SCSI SECOND LEVEL ADDRESSING TO MAP STORAGE VOLUME TO HOST OF CONTAINER ENVIRONMENT, WHEREIN SAID STORAGE VOLUME IS SCANNED AT SAID SCSI SECOND LEVEL ADDRESSING WITHOUT RESCANNING AT OS LEVEL VIRTUALIZATION

BACKGROUND

The present invention relates to software containers, and more specifically, this invention relates to implementing storage volumes for persistent data in software containers.

Operating system level virtualization, such as the use of software containers, is increasing in popularity. Although software containers were originally designed for stateless applications, there is currently a high demand for the use of persistent containers in stateful applications. However, current implementations of stateful containers have performance and scalability issues and limitations.

SUMMARY

A computer-implemented method according to one embodiment includes identifying a host within a container environment, and mapping a volume of a container to the host within the container environment, utilizing small computer system interface (SCSI) second level addressing.

According to another embodiment, a computer program product for improving scale and performance for persistent containers using SCSI second level addressing comprises a computer readable storage medium having program instructions embodied therewith, where the computer readable storage medium is not a transitory signal per se, and where the program instructions are executable by a processor to cause the processor to perform a method comprising identifying a host within a container environment, utilizing the processor, and mapping, utilizing the processor, a volume of a container to the host within the container environment, utilizing the SCSI second level addressing.

A system according to another embodiment includes a processor, and logic integrated with the processor, executable by the processor, or integrated with and executable by the processor, where the logic is configured to identify a host within a container environment, and map a volume of a container to the host within the container environment, utilizing SCSI second level addressing.

Other aspects and embodiments of the present invention will become apparent from the following detailed description, which, when taken in conjunction with the drawings, illustrate by way of example the principles of the invention.

DETAILED DESCRIPTION

Figure 1:
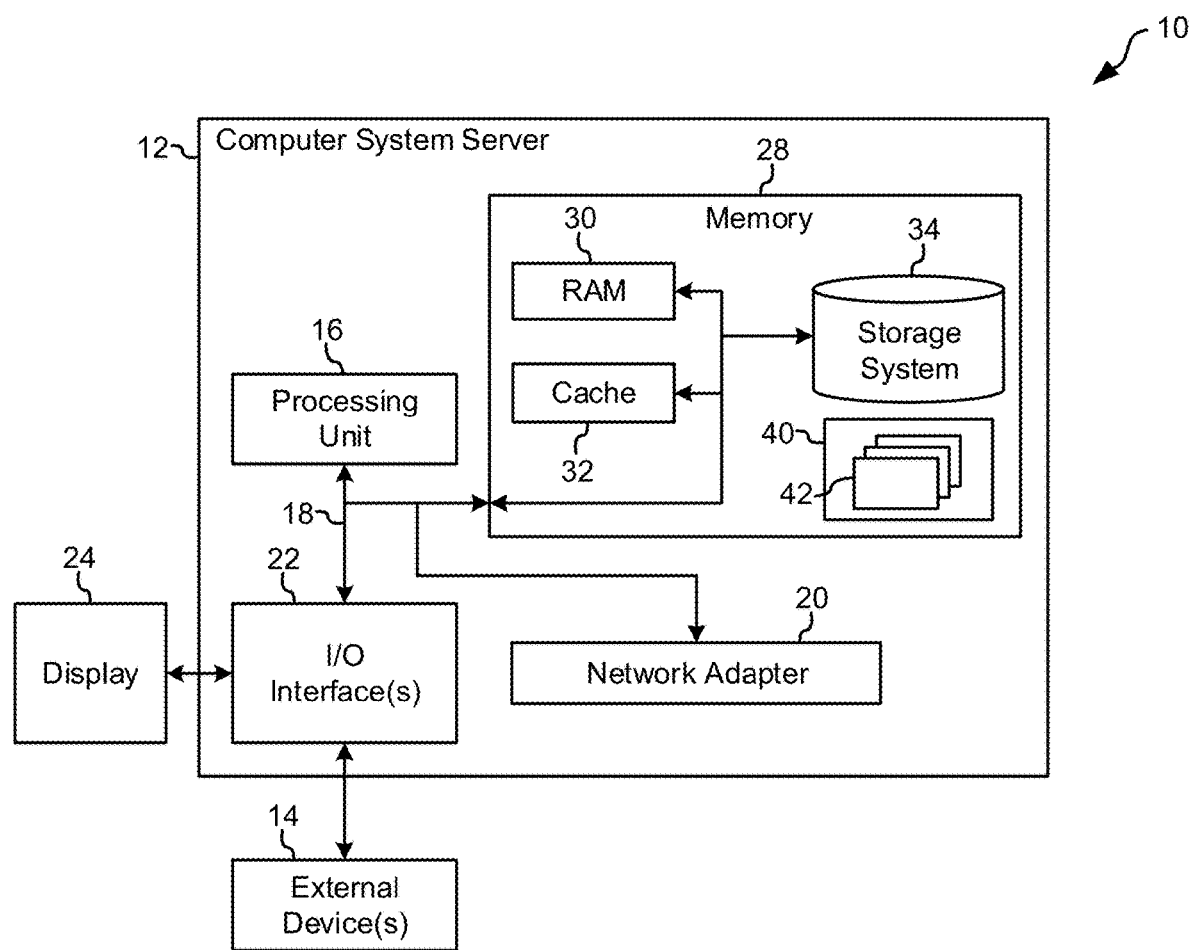
FIG. 1 depicts a cloud computing node according to an embodiment of the present invention.

The following description discloses several preferred embodiments of systems, methods and computer program products for improving scale and performance for persistent containers using SCSI second level addressing. Various embodiments provide a method for mapping a volume to a host within a container environment, utilizing second level addressing.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for improving scale and performance for persistent containers using SCSI second level addressing.

In one general embodiment, a computer-implemented method includes identifying a host within a container environment, and mapping a volume of a container to the host within the container environment, utilizing small computer system interface (SCSI) second level addressing.

In another general embodiment, a computer program product for improving scale and performance for persistent containers using SCSI second level addressing comprises a computer readable storage medium having program instructions embodied therewith, where the computer readable storage medium is not a transitory signal per se, and where the program instructions are executable by a processor to cause the processor to perform a method comprising identifying a host within a container environment, utilizing the processor, and mapping, utilizing the processor, a volume of a container to the host within the container environment, utilizing the SCSI second level addressing.

In another general embodiment, a system includes a processor, and logic integrated with the processor, executable by the processor, or integrated with and executable by the processor, where the logic is configured to identify a host within a container environment, and map a volume of a container to the host within the container environment, utilizing SCSI second level addressing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
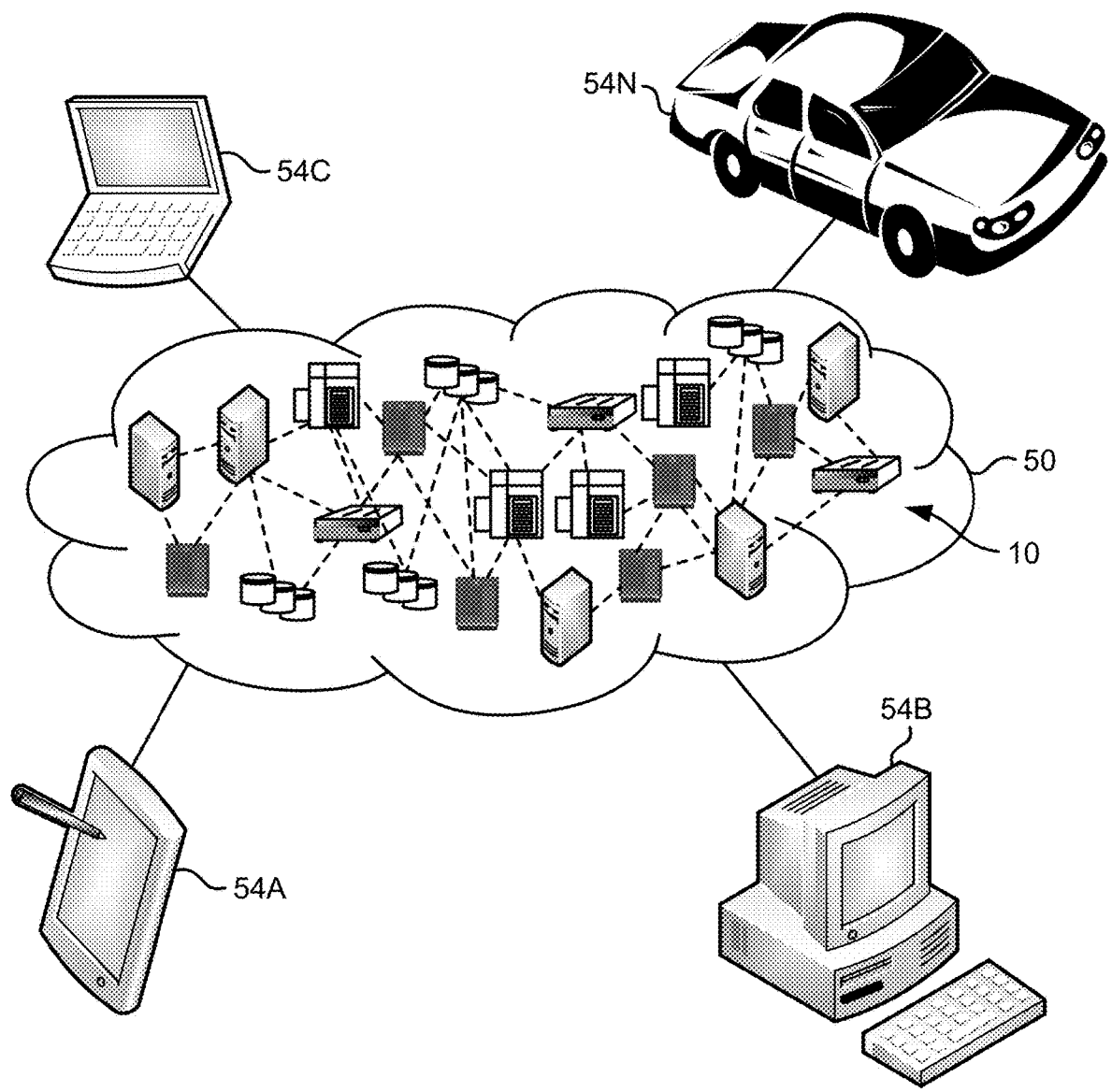
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
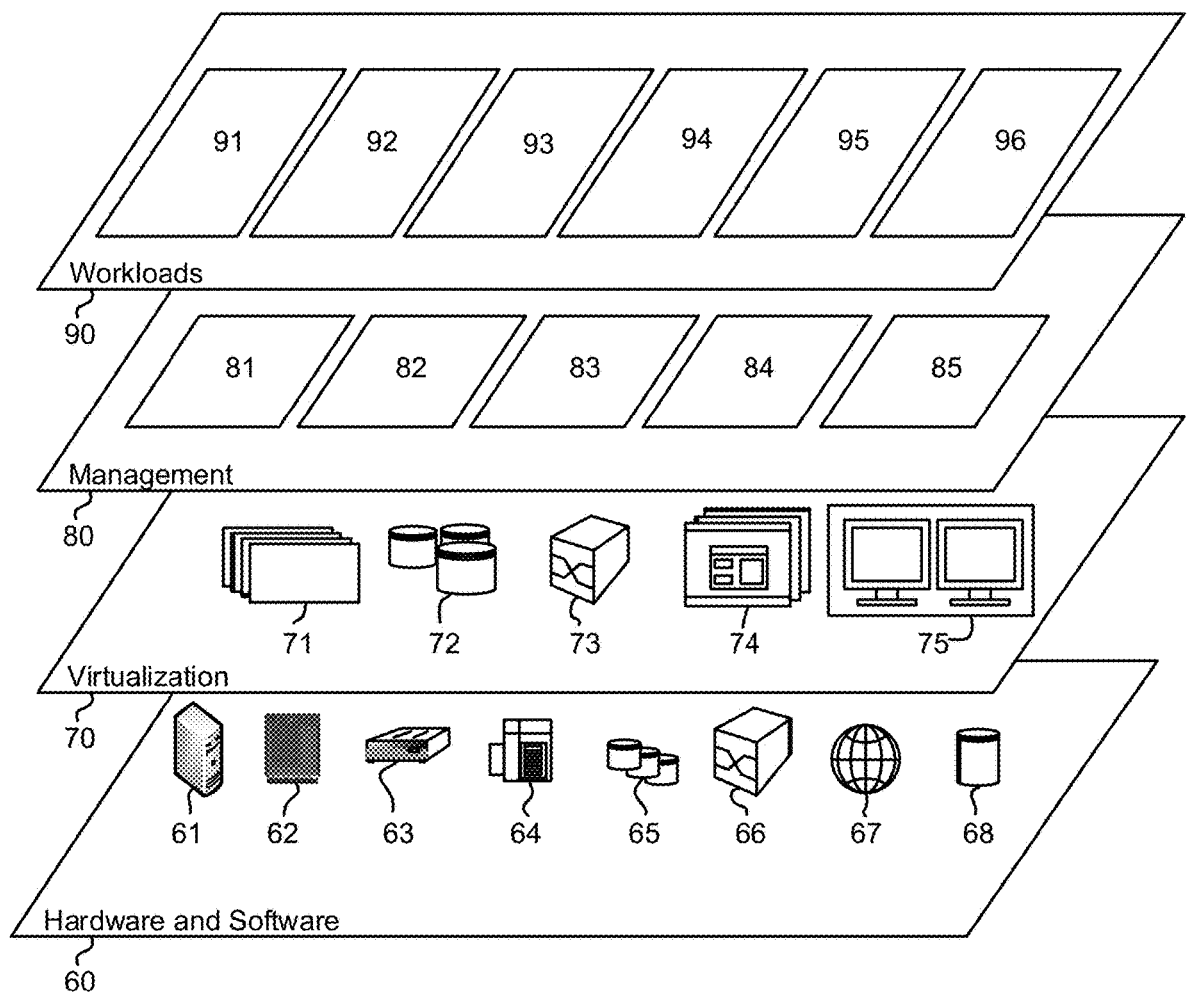
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software containers 96.

Figure 4:
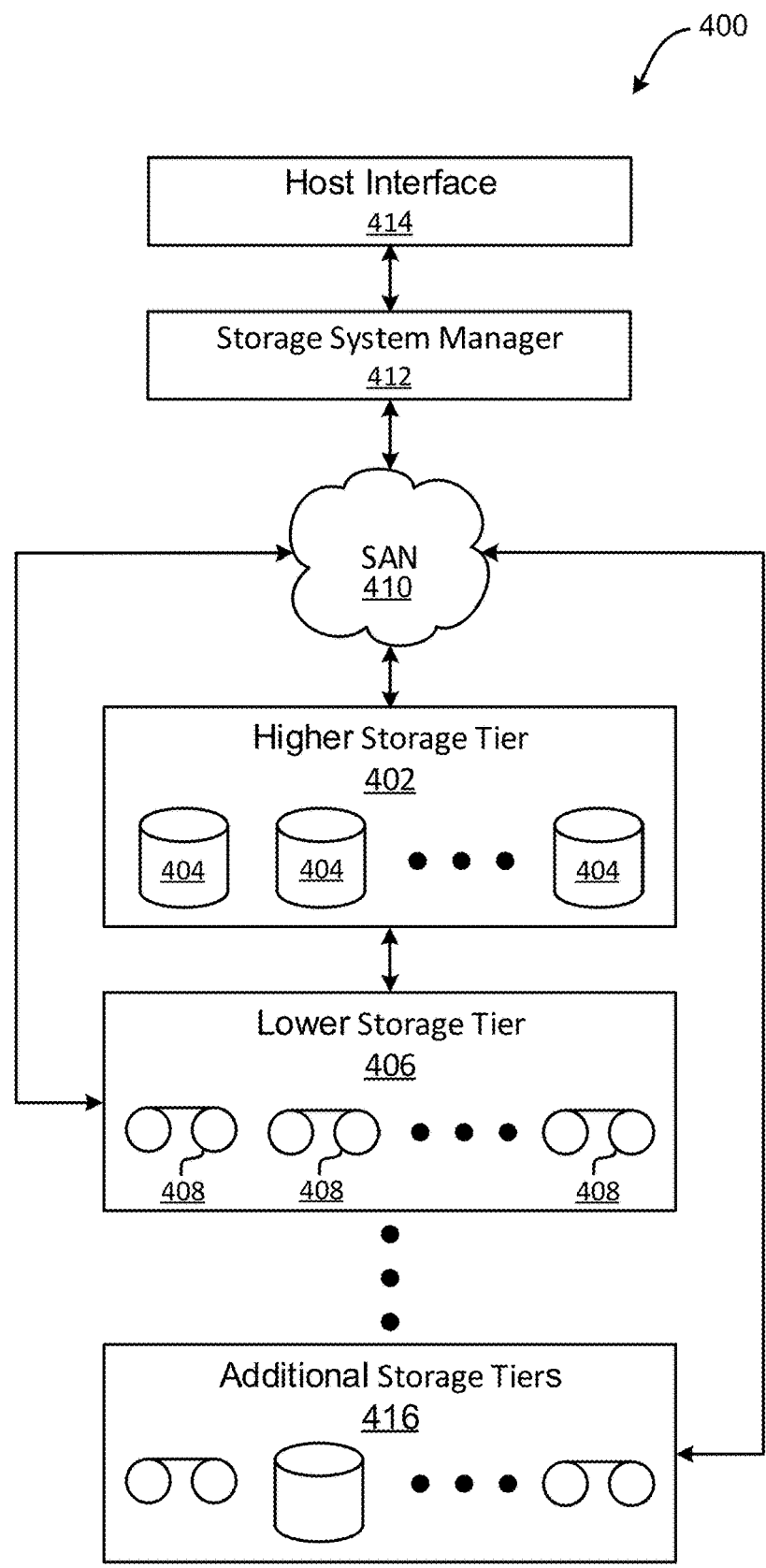
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
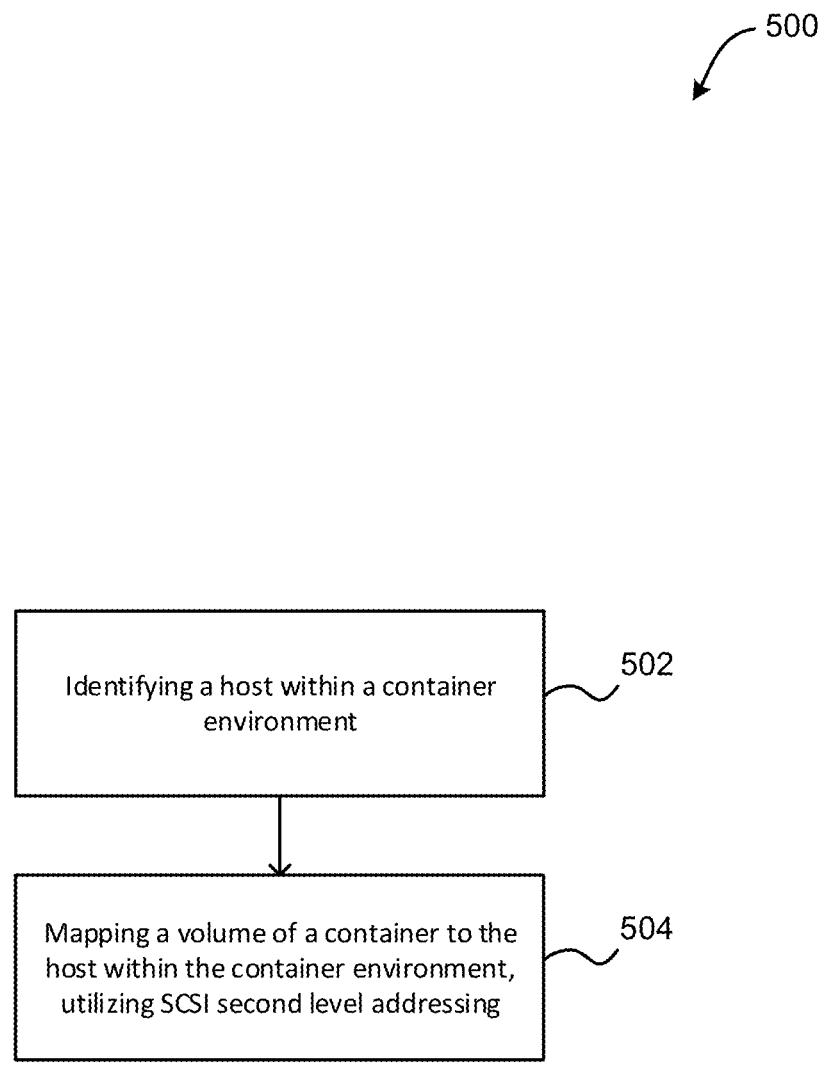
FIG. 5 illustrates a flowchart of a method for improving scale and performance for persistent containers using SCSI second level addressing, in accordance with one embodiment.

Now referring to FIG. 5, a flowchart of a method 500 is shown according to one embodiment. The method 500 may be performed in accordance with the present invention in any of the environments depicted in FIGS. 1-4 and 7, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a host is identified within a container environment. In one embodiment, the container environment may include an operating system level server virtualization. For example, a single operating system (OS) kernel of the container environment may implement multiple isolated user space instances (e.g., containers). In another example, the container environment may include a container implementation such as Docker™ Rocket™, Linux™ containers (LXC), Windows™ containers, etc. In yet another example, the container environment may include an OS level virtualization for running multiple isolated systems called containers on a host using a single kernel (e.g., a Linux™ kernel, etc.)

Additionally, in one embodiment, the host may include a container engine. For example, the container engine may implement and manage a plurality of containers within the container environment. In another embodiment, each container within the container environment may include a software application encapsulated with a plurality of elements necessary to run the software application. For example, each container may include one or more of application code, a runtime environment, system tools, system libraries, etc. In yet another embodiment, the container environment may be implemented within a cloud computing environment.

Further, method 500 may proceed with operation 504, where a volume of a container is mapped to the host within the container environment, utilizing SCSI second level addressing. In one embodiment, the volume may include a storage volume used as persistent storage for the container.

For example, the volume may allow the container to save a state of data within the container (e.g., as files, etc.). In another embodiment, mapping the volume may allow for persistent storage within the container. For example, mapping the volume may enable the container to be a persistent container (e.g., a container with a dedicated volume in backend storage, where the persistent storage maintains the data even after the container is restarted on the same container engine or even if the container migrates to a different container engine (e.g. due to power failure, etc.), etc.).

Further still, in one embodiment, mapping the volume may include specifying a location of data of the volume to the host. In another embodiment, the volume of the container may be mapped directly to a container engine of the host. For example, the volume may be mounted as a file system inside a container during a startup of the container.

Also, in one embodiment, the SCSI second level addressing may utilize the second level within a hierarchical addressing scheme (e.g., a SCSI addressing scheme, etc.). In another embodiment, the second level addressing may include first translating a virtual memory address to a pseudo physical address, and then translating the pseudo physical memory address to a machine physical memory address within the container environment. For example, the translating may be performed by the host. In another embodiment, the second level addressing may include a second level addressing methodology used for LXC containers, which may include an OS-level virtualization method for running multiple isolated containers on a control host using a single kernel.

For example, a logical unit number (LUN) may be used to identify a logical unit (e.g., a volume addressed utilizing the SCSI protocol, etc.). Additionally, when SCSI second level addressing is utilized to perform mapping, instead of having a storage system allocate a LUN on the SCSI BUS for each volume being mapped, only one LUN may be mapped to the host for a plurality of volumes. For instance, the one LUN mapped to the host may be named the "Admin LUN." This LUN may act as a gateway for the I/O to all the volumes that are accessible to the host within the container environment.

In one embodiment, utilizing SCSI second level addressing, a "bind" request may be implemented in a similar manner to a "mapping" request, where the host may receive an address which it is using when sending an I/O request through the "Admin LUN". The storage system may know to send the I/O to the volume according to the address.

In addition, in one embodiment, the second level addressing may be implemented by developing or updating a driver (e.g., a Linux™ driver, etc.) that implements second level handling requests within the container environment (e.g., in order to support the second level addressing method). For example, the driver may be familiar with the second level addressing protocol. In this way, the OS kernel of the container environment may be made aware of the second level addressing protocol. In another embodiment, the driver may perform operations on data within the container (e.g., bind, unbind, create volume, map volume, rescan volume, etc.).

Furthermore, in one embodiment, the second level addressing may be implemented by developing or updating a library to work with the second level addressing. In this way, the container infrastructure may be adapted utilizing a new or updated driver and library that enables the recognition and implementation of second level addressing within the container environment.

Further still, in one embodiment, mapping the volume utilizing the second level addressing may avoid an operating system (OS) rescan. For example, in response to the mapping, the mapped volume may be scanned on the fly at the SCSI second level, not the OS level, and the volume may therefore be identified without the need for a rescan. This may improve dramatically a performance of the software container environment by reducing an amount of time and resources necessary to add a volume to the environment. This may also reduce a speed of migrations within the container environment. It will also help to spin up a container, because the volume was mapped much faster which may allow the container engine (e.g., a Docker engine, etc.) to start the application in the container much faster instead of waiting many seconds for the OS rescan to be finished.

Additionally, in one embodiment, when a container engine is going down an orchestrator container system (e.g., Kubernates™, Mesos™, Docker Swarm™, etc.), the container engine may automatically move all the containers from a failing container engine to another container engine in the cluster. Such operation in regular OS rescanning may be time intensive in a case where many stateful containers exist in the failing container engine. This may require a lot of rescans for each stateful container, and the application inside the container may be in down time during the rescans.

However, by using second level addressing in the above scenario, the migration of many stateful containers from one container engine to another may be faster and may provide better availability to the containers (e.g., less down time due to fast rescans and mapping).

Further, the technique of second level addressing in a container environment may allow for optimal application granularity. For example, when a volume granularity is per container (e.g., during an application of a micro service, etc.) SLA per micro service may be improved. For instance, a first micro service may be provided for a database with specific storage requirements, a second micro service may be provided for logging with different storage requirements, and a third micro service may be provided for web applications with caching with different storage requirements. By allowing container granularity, unique storage requirements may be applied for every micro service (e.g., container/application, etc.).

Using second level addressing may allow the use of volume per container (and even more) without fear of impacting the performance of the system. Without using SLA, other techniques like NFS may have lower performance when compared to SCSI. Using block storage in a large containerized environment without second level addressing may cause rescan issues and scalability limitations.

Also, in one embodiment, mapping the volume utilizing the second level addressing may increase a scalability of the environment. For example, an amount of storage available within the environment may be increased utilizing the second level addressing. For instance, traditional mapping may limit an allocation of volumes to a first number (e.g., from 255-64k, etc.), and mapping using the second level addressing may allow for the allocation of a second number of mapped volumes that is greater than the first number (e.g., $2^{24}$, etc.).

In another embodiment, applying second level addressing for containers may enable container—application granularity that cannot be done without such implementation. In addition, implementing second level addressing may enable the container host to be able to provide for future demand, for example hundreds\thousands of stateful containers in a single container engine.

Figure 6:
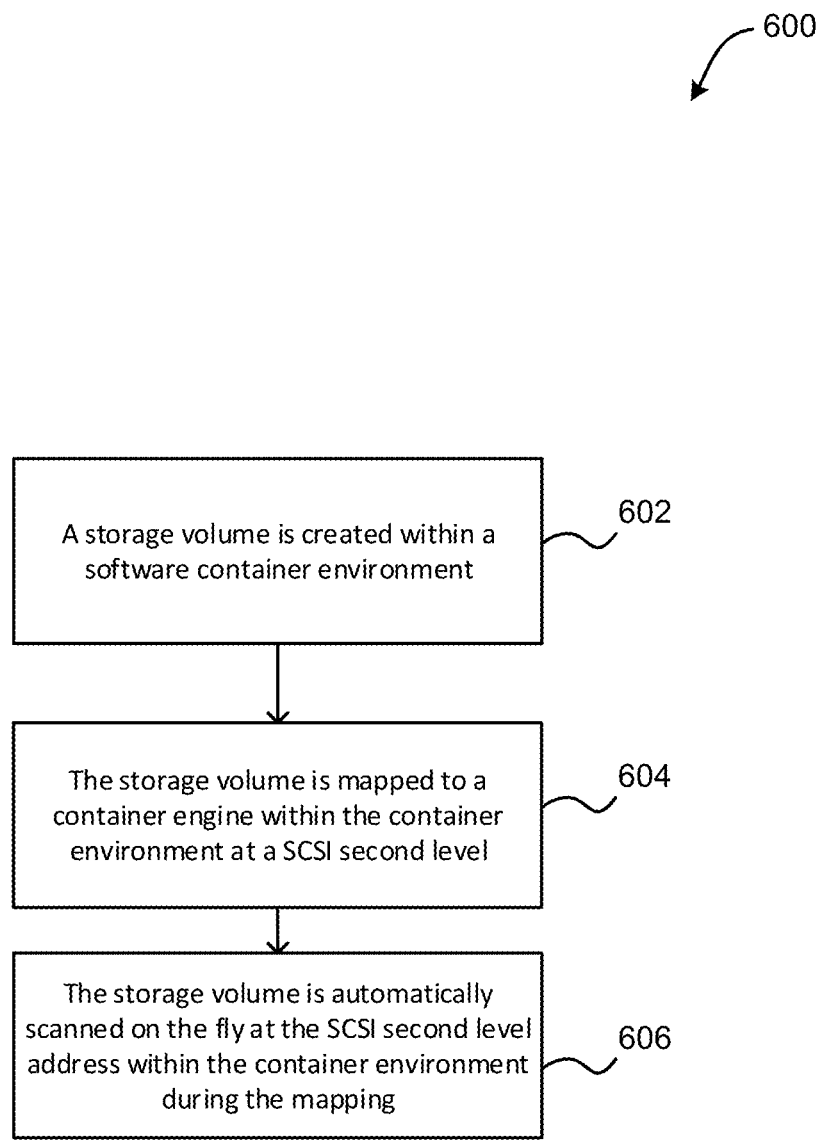
FIG. 6 illustrates a flowchart of a method for mapping and scanning a storage volume in a container environment, in accordance with one embodiment.

Now referring to FIG. 6, a flowchart of a method 600 for mapping and scanning a storage volume in a container environment is shown according to one embodiment. The method 600 may be performed in accordance with the present invention in any of the environments depicted in FIGS. 1-4 and 7, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a storage volume is created within a software container environment. Additionally, method 600 may proceed with operation 604, where the storage volume is mapped to a container engine within the container environment at a SCSI second level address. Further, method 600 may proceed with operation 606, where the storage volume is automatically scanned on the fly at the SCSI second level within the container environment during the mapping. In this way, an OS level rescan may be avoided within the container environment, because there is no need to rescan the whole host SCSI bus. In another embodiment, the storage volume may be automatically scanned on the fly at the SCSI second level within the container environment during the detaching of the storage volume.

Figure 7:
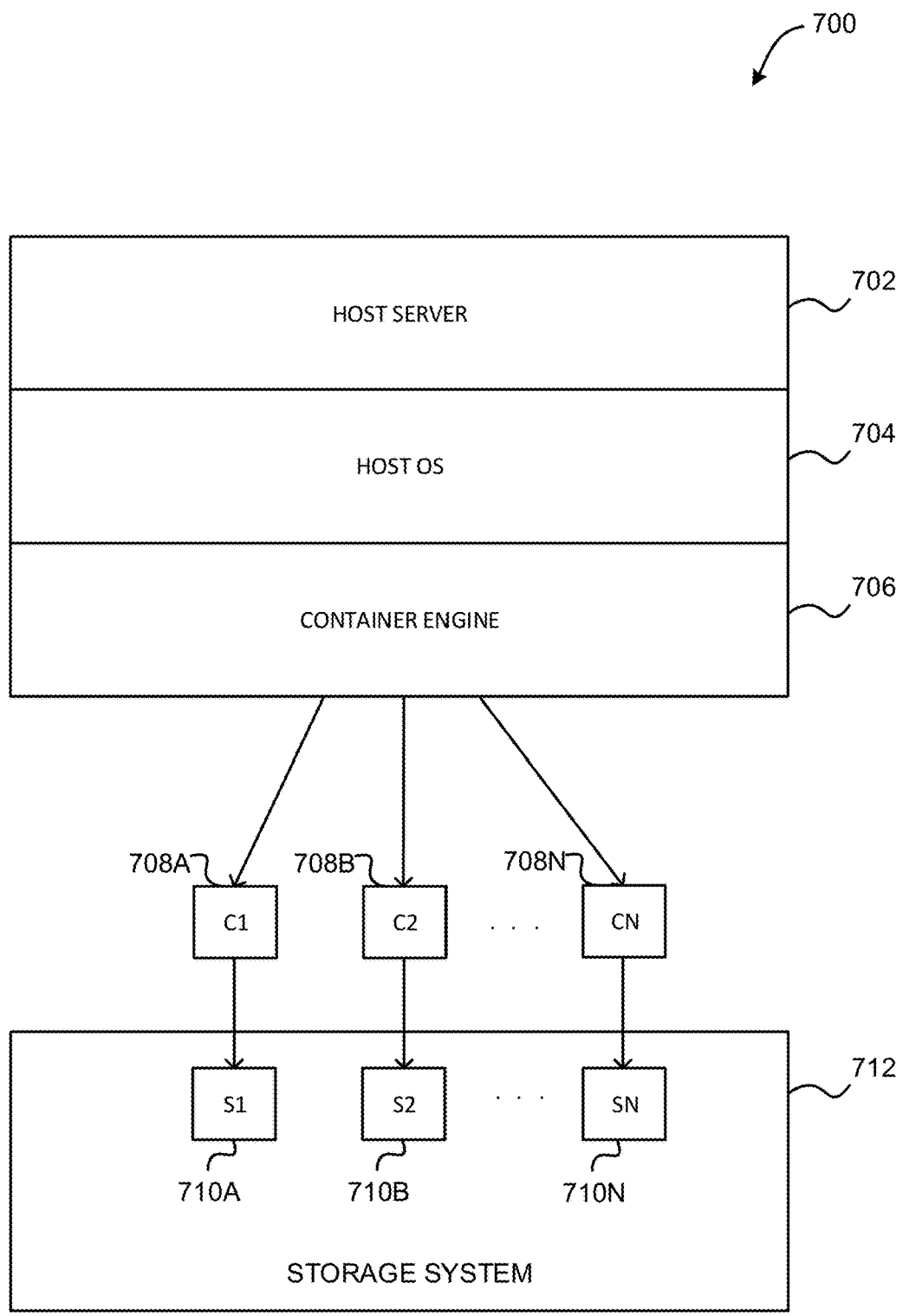
FIG. 7 illustrates an exemplary container environment, in accordance with one embodiment.

FIG. 7 illustrates an exemplary container environment 700, according to one embodiment. As shown, the container environment 700 includes a host server 702 and host operating system 704 that implement a single container engine 706. In one embodiment, the host server 702 may include a single server device, and the host operating system 704 may include a single kernel.

Additionally, the container engine 706 implements a plurality of containers 708A-N. In one embodiment, each of the plurality of containers 708A-N may include an isolated user space instance created utilizing a virtualization method (e.g., operating system level virtualization, etc.). Further, each of the plurality of containers 708A-N is associated with one of a plurality of storage volumes 710A-N implemented within a storage system 712. In one embodiment, the storage system 712 may include a hardware storage device, and each of the plurality of storage volumes 710A-N may be implemented as hardware within the storage system 712.

Further still, in one embodiment, each of the plurality of storage volumes 710A-N may be mapped directly to the container engine 706 upon creation, utilizing SCSI second level addressing. In this way, scanning may be performed on the fly for each of the plurality of storage volumes 710A-N at the SCSI second level when they are created.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying a storage volume implemented within a storage device;
   mapping the storage volume to a host within a container environment, utilizing small computer system interface (SCSI) second level addressing, where:
   the host includes a container engine that implements and manages a plurality of containers within an operating system (OS) level virtualization,
   the plurality of containers each includes application code encapsulated with a runtime environment, system tools, and system libraries,
   mapping the storage volume to the host includes specifying a location of data of the storage volume to the host by mounting the storage volume as a file system within one of the plurality of containers during a startup of the container, and
   the SCSI second level addressing includes a translation, by the host, of a virtual memory address to a pseudo physical memory address, and a translation, by the host, of the pseudo physical memory address to a machine physical memory address within the container environment; and
   in response to the mapping, automatically scanning the storage volume utilizing the SCSI second level addressing without rescanning the storage volume at the OS level virtualization.

2. The computer-implemented method of claim 1, wherein a single logical unit number (LUN) is mapped to the host for a plurality of storage volumes accessible to the host within the container environment, the single LUN acting as a gateway for all input and output (I/O) to all of the plurality of storage volumes, and further comprising:
   sending, by the host, an I/O request through the single LUN;
   receiving an address in response to the I/O request; and sending the I/O to one of the plurality of storage volumes accessible to the host within the container environment, utilizing the address.

3. The computer-implemented method of claim 1, wherein a single logical unit number (LUN) is mapped to the host for a plurality of storage volumes accessible to the host within the container environment, the single LUN acting as a gateway for all input and output (I/O) to all of the plurality of storage volumes, and further comprising:
sending, by the host, an I/O request through the single LUN;
receiving an address in response to the I/O request; and sending the I/O to one of the plurality of storage volumes accessible to the host within the container environment, utilizing the address;
wherein an OS kernel of the container environment is made aware of a SCSI second level addressing protocol via a driver that supports the SCSI second level addressing protocol by implementing second level handling requests within the container environment.

4. The computer-implemented method of claim 1, wherein a single logical unit number (LUN) is mapped to the host for a plurality of storage volumes accessible to the host within the container environment, the single LUN acting as a gateway for all input and output (I/O) to all of the plurality of storage volumes, and further comprising:
sending, by the host, an I/O request through the single LUN;
receiving an address in response to the I/O request; and sending the I/O to one of the plurality of storage volumes accessible to the host within the container environment, utilizing the address;
wherein an OS kernel of the container environment is made aware of a SCSI second level addressing protocol via a driver that supports the SCSI second level addressing protocol by implementing second level handling requests within the container environment;
wherein the storage volume is used as persistent storage for one of the plurality of containers, where the persistent storage maintains data even after the container is stopped, restarted or migrated to different host.

5. The computer-implemented method of claim 1, wherein mapping the storage volume to the host within the container environment, utilizing the SCSI second level addressing, includes mapping a single logical unit number (LUN) to the host for the storage volume.

6. The computer-implemented method of claim 1, wherein each of the plurality of containers include an isolated user space instance.

7. The computer-implemented method of claim 1, wherein:
the storage volume is used as persistent storage for one of the plurality of containers, where the persistent storage maintains data even after the container is stopped, restarted or migrated to different container engine.

8. A computer program product for improving scale and performance for persistent containers using SCSI second level addressing, the computer program product comprising a computer readable storage medium having program instructions embodied therewith, wherein the computer readable storage medium is not a transitory signal per se, the program instructions executable by a processor to cause the processor to perform a method comprising:
identifying a storage volume implemented within a storage device, utilizing the processor;
mapping, utilizing the processor, the storage volume to a host within a container environment, utilizing the SCSI second level addressing, where:
the host includes a container engine that implements and manages a plurality of containers within an operating system (OS) level virtualization,
the plurality of containers each includes application code encapsulated with a runtime environment, system tools, and system libraries,
mapping the storage volume to the host includes specifying a location of data of the storage volume to the host by mounting the storage volume as a file system within one of the plurality of containers during a startup of the container, and
the SCSI second level addressing includes a translation, by the host, of a virtual memory address to a pseudo physical memory address, and a translation, by the host, of the pseudo physical memory address to a machine physical memory address within the container environment; and
in response to the mapping, automatically scanning the storage volume utilizing the processor and the SCSI second level addressing without rescanning the storage volume at the OS level virtualization.

9. The computer program product of claim 8, wherein the storage volume is used as persistent storage for one of the plurality of containers, where the persistent storage maintains data even after the container is stopped, restarted or migrated to different host.

10. The computer program product of claim 8, wherein mapping the storage volume to the host within the container environment, utilizing the SCSI second level addressing, includes mapping a single logical unit number (LUN) to the host for a plurality of volumes.

11. The computer program product of claim 8, wherein a single logical unit number (LUN) is mapped to the host for a plurality of storage volumes accessible to the host within the container environment, the single LUN acting as a gateway for all input and output (I/O) to all of the plurality of storage volumes, and further comprising:
sending, by the host, an I/O request through the single LUN;
receiving an address in response to the I/O request; and sending the I/O to one of the plurality of storage volumes accessible to the host within the container environment, utilizing the address.

12. A system, comprising:
a processor; and
logic integrated with the processor, executable by the processor, or integrated with and executable by the processor, the logic being configured to:
identify a storage volume implemented within a storage device;
map the storage volume to a host within a container environment, utilizing SCSI second level addressing, where:
the host includes a container engine that implements and manages a plurality of containers within an operating system (OS) level virtualization,
the plurality of containers each includes application code encapsulated with a runtime environment, system tools, and system libraries,
mapping the storage volume to the host includes specifying a location of data of the storage volume to the host by mounting the storage volume as a file system within one of the plurality of containers during a startup of the container, and the SCSI second level addressing includes a translation, by the host, of a virtual memory address to a pseudo physical memory address, and a translation, by the host, of the pseudo physical memory address to a machine physical memory address within the container environment; and in response to the mapping, automatically scan the storage volume utilizing the SCSI second level addressing without rescanning the storage volume at the OS level virtualization.

\* \* \* \* \*